United States Patent [19]

Hoff

[11] 4,039,472
[45] Aug. 2, 1977

[54] INCREASING THE PARTICLE SIZE OF AS FORMED POLYETHYLENE OR ETHYLENE COPOLYMER

[75] Inventor: Glen R. Hoff, Naperville, Ill.

[73] Assignee: Standard Oil Company (Indiana), Chicago, Ill.

[21] Appl. No.: 631,954

[22] Filed: Nov. 14, 1975

[51] Int. Cl.$^2$ .......................... C08F 4/66; C08F 4/68
[52] U.S. Cl. ................................ 252/429 C; 526/187
[58] Field of Search .................................. 252/429 C

[56] References Cited

U.S. PATENT DOCUMENTS

| | | | |
|---|---|---|---|
| 3,392,159 | 7/1968 | Schooley et al. | 252/429 C X |
| 3,489,729 | 1/1970 | Kahle et al. | 252/429 C X |
| 3,644,318 | 2/1972 | Diedrich et al. | 252/429 C X |
| 3,658,722 | 4/1972 | Delboville et al. | 252/429 C |
| 3,951,935 | 4/1976 | Engelmann | 252/429 C X |

*Primary Examiner*—Patrick P. Garvin
*Attorney, Agent, or Firm*—Reed F. Riley; Arthur G. Gilkes; William T. McClain

[57] ABSTRACT

The particle size of as formed polyethylene or ethylene copolymer containing up to about twenty percent of a $C_3$ to $C_8$ olefin can be increased by using a high yield, solid catalyst component prepared from (1) a magnesium alkoxide, (2) a titanium (IV) or vanadium (V) chloride, chloroalkoxide or alkoxide, (3) an alkylaluminum compound, and (4) hydrogen chloride. The particle size of as formed polymer can be increased substantially using the hydrogen-chloride-prepared catalyst component, compared to the particle size of polymer made using a similar catalyst component prepared without the use of hydrogen chloride, when either is employed with an alkylaluminum compound promoter in a slurry or vapor phase polymerization process at moderate polymerization temperatures and pressures.

10 Claims, No Drawings

INCREASING THE PARTICLE SIZE OF AS FORMED POLYETHYLENE OR ETHYLENE COPOLYMER

SUMMARY OF THE INVENTION

This invention relates to a novel, high yield catalyst combination for producing larger particle size as formed polyethylene or ethylene copolymer, which catalyst combination is composed of a solid catalyst component made using a chloride-affording-agent and an alkylaluminum compound promoter and, more particularly, it relates to a novel, high yield catalyst combination for making larger particle size polyethylene or ethylene copolymer, which combination is made using a solid catalyst component prepared from (1) a magnesium dialkoxide, (2) a titanium (IV) or vanadium (V) compound, (3) an alkylaluminum compound, and (4) hydrogen chloride and an alkylaluminum compound promoter.

In accordance with the instant invention, larger particle size as formed polyethylene or ethylene copolymer containing up to about twenty mol percent of a $C_3$ to $C_8$ olefin can be made by a novel, high yield catalyst combination comprising a solid catalyst component prepared from (1) a magnesium dialkoxide, (2) a titanium (IV) or vanadium (V) alkoxide, chloroalkoxide or chloride, (3) an alkylaluminum compound, and (4) hydrogen chloride and an alkylaluminum compound promoter.

BACKGROUND OF THE INVENTION

Recently, highly-active supported transition metal compound catalyst combinations based upon the use of magnesium compounds have become available for the commercial production of polyethylene. For example, German Offenlegunsschrift No. 2,123,356 teaches polymerization of ethylene with an alkylaluminum compound promoter and a solid catalyst component made from a magnesium dialkoxide, a titanium (IV) compound and an alkylaluminum halide. Many of these catalysts, however, create serious problems in the particle-form and vapor phase ethylene polymerization processes because the particle size of the polymeric product is so fine that difficulties are encountered in the separation and handling of the polymer products; particularly, trouble occurs in the extrusion and compounding steps involved in producing a commercial product.

Now, new catalyst combinations have been found which have the high activities of the new generation supported and promoted transition metal catalysts but produce polymer of sufficiently large particle size so that the above-referred to problem is reduced or eliminated completely. The solution to this problem involves using a new solid catalyst component made using hydrogen chloride.

STATEMENT OF THE INVENTION

The solid catalyst component of the catalyst combination is of the supported, transition-metal-containing variety and is made from at least four materials. The first material is a magnesium dialkoxide. Preferably, any lower alkyl, dialkoxide can be employed. More preferably, a dialkoxide having an alkyl radical of from one to about four carbon atoms is used, and, most preferably, magnesium diethoxide is the first material.

The second material is preferably a transition metal compound which is a lower alkyl, titanium (IV) or vanadium (V) alkoxide, alkoxychloride or chloride. More preferably, it is a lower alkyl, titanium (IV) or vanadium (V) alkoxide and, most preferably, it is a lower alkyl, titanium (IV) alkoxide such as titanium tetraethoxide, tetrapropoxide, tetraisopropoxide, tetrabutoxide, tetraisobutoxide, etc. Mixtures of titanium (IV) and vanadium (V) compounds can also be used as well as mixtures of a titanium (IV) compound and a zirconium (IV) chloride or alkoxide.

The third material is preferably any lower alkyl, alkylaluminum compound such as a trialkylaluminum, a dialkylaluminum chloride or an alkylaluminum dichloride. More preferably, the third material is an alkylaluminum dichloride in which the alkyl group contains from one to about four carbon atoms. Most preferably, the third material is ethylaluminum dichloride.

The term lower alkyl as used above includes alkyl groups of from one to about six carbon atoms.

The chloride-affording-agent used to make the solid transitionmetal-containing catalyst component is preferably hydrogen chloride.

At least two modes of preparation of the solid catalyst component give good results in producing a component giving a larger as formed polymer particle size while maintaining a high polymerization yield when used with a promoter. The first is to react, preferably in the presence of an inert diluent, a magnesium dialkoxide and at least one transition metal compound, combine the product thereof with the alkylaluminum compound, and thereafter treat the resulting solid product with the chloride-affording-agent. The second is to react the magnesium dialkoxide, the transition metal compound and the alkylaluminum compound together, preferably in the presence of an inert diluent, and thereafter react the resulting solid product with the chloride-affording-agent.

The relative amount of magnesium dialkoxide and transition metal compound used to make up the solid catalyst component is preferably about one-tenth to three mols of the transition metal compound or compounds per mol of magnesium alkoxide used and, more preferably, about one-half to one and one-half mols of the transition metal compound or compounds per mol of magnesium alkoxide used. The amount of the alkylaluminum compound used in the catalyst component preparation is about two-tenths to ten mols of alkylaluminum compound per mol of transition metal compound used. More preferably, this latter ratio varies between about one-half to five mols of alkylaluminum compound per mol of transition metal compound used.

The total amount of chloride-affording-agent used to prepare the solid catalyst component is preferably greater than one mol of hydrogen chloride for each mol of alkylaluminum compound used to prepare the solid catalyst component and, more preferably, it is between about one and six mols per mol of alkylaluminum compound reactant used. Most preferably, about one and four mols of chloride-affording-agent per mol of alkylaluminum compound reactant is employed. Too little of the chloride-affording-agent does not give the maximum particle size increase whereas too great an amount is wasteful and interferes with the physical qualities of the catalyst component. The chloride-affordingagent is generally added to the preparation suspended in an inert liquid diluent after insuring that the agent and diluent are dry and substantially free of other polar compounds.

It is convenient to bubble gaseous hydrogen chloride through the preparation suspension with stirring. However, other methods of treatment may be used such as passing the agent in the gas phase over the surface of the other reactants or an intermediate product.

Preferably, most preparative steps involved in making the catalyst component are carried out by heating in the temperature range from above about ambient to about 150° C. and, more preferably, in the range of from above about 30° C to about 120° C. Generally, preparative steps involving the alkylaluminum compound are carried out at the lower end of the above ranges whereas steps involving alkoxides, particularly Ti(OR)$_4$ compounds, are best carried out at the upper end of the above ranges.

In the step wherein the chloride-affording-agent is used, the reaction temperature is preferably in the range from about ambient to about 70° C and, more preferably, in the range from about ambient to about 50° C.

It is generally efficacious and preferred to carry out each reaction step by heating the reactants in an inert, liquid diluent. However, where the transition metal compound is reacted in a separate step such compounds if stable and liquid can be used neat. By inert liquid diluent is meant a diluent which at least partially dissolves one or more reactants and is substantially unreactive with the reactants and products at the reaction temperature. Hydrocarbons, aromatic or aliphatic, such as benzene or heptane and their halo derivatives are excellent for this purpose if they can be conveniently handled at the reaction temperature. Aliphatic hydrocarbons such as a hexane, an octane or a decane, etc. are preferred. It is important, for best results, that the inert liquid diluent chosen is purified prior to use from traces of moisture, oxygen, etc. and traces of polar organic substances by, for example, percolating the diluent through silica gel or molecular sieves.

Preferably, each reaction step is allowed to continue about thirty minutes to about 48 hours and, more preferably, about two hours to about 24 hours. The step involving employment of hydrogen chloride is generally substantially faster.

The amount of transition metal combined in the support material is relatively small being in the range of one-tenth to fifteen weight percent, calculated as the metal, of the support weight. More preferably, it is between one-half to ten weight percent. Other things being equal, the more transition element compound combined with the support material, the more active the supported catalyst becomes. Too much, however, can be wasteful of the transition metal compound and also can lead to decreased yields.

Use of the new catalyst component for the polymerization of olefins is accompanied for best results by employment of a promoter which is preferably an alkylaluminum compound. More preferably, it is a lower alkyl, trialkylaluminum, a dialkylaluminum hydride or a dialkylaluminum chloride and, most preferably, a lower alkyl, trialkylaluminum is the promoter used. By lower alkyl is meant an alkyl group containing between one and about six carbon atoms.

For particle form polymerization the total amount of alkylaluminum promoter used depends upon whether the promoter is mixed with the polymerization diluent, if used, as well as the solid catalyst component. For preferable results employing a process using a diluent, the ratio of total millimols of promoter used to grams of solid catalyst component should be at least about two to one. More preferably, it is at least about ten to one and, most preferably, it is at least about twenty-five to one. This ratio depends upon polymerization temperature somewhat, increasing as polymerization temperature decreases and also upon diluent purity and the amount of diluent used. For vapor phase polymerization the amount of alkylaluminum compound required is substantially less.

The solid catalyst component of this invention can be used in the particle form variation in the temperature range from above about ambient to about 130° C. The catalyst component can be used also in an essentially diluent-less process wherein, for example, the olefin is polymerized directly from the vapor phase. The polymerization temperature using the essentially diluent-less process should be large enough to give an adequate polymerization rate but not too large to raise the pressure above that which is normally used in this type of process, i.e., several hundred p.s.i.g. or soften the particulate polymer contained in the reactor.

In the particle-form process, the polymerization is carried out at a temperature such that the polymer as formed is a solid in the polymerization reactor. The preferred polymerization temperature is about 40° C. to about 110° C. In vapor phase polymerizations wherein the catalyst component, promoter, monomer and quench liquid, if used, are important components, the preferable temperature range is from about 0° C. to about 130° C. and, more preferably, about 20° C. to about 120° C.

Whereas the olefin preferred for use with catalyst combination is ethylene, it has been found that the solid catalyst component is also useful for making larger particle size ethylene copolymers containing up to about twenty mol percent of a $C_3$ to $C_8$ olefin like propene, a butene, a pentene, etc. or polymerizable diolefin such as butadiene, isoprene, etc.

It is of particular importance for best results that the olefin, for example ethylene, be substantially free of catalyst poisons. Thus, it is preferred to use polymerization grade ethylene and to pass it through a molecular sieve prior to use the remove the remaining traces of moisture, oxygen, carbon dioxide and polar organic compounds.

The polymerization diluent employed in a particle form process can be an aliphatic alkane or cycloalkane such as isobutane, pentane, hexane, heptane or cyclohexane or a hydrogenated aromatic compound such as tetrahydronaphthalene or decahydronaphthalene or a high molecular weight liquid paraffin or mixture or paraffins which are liquid at the reaction temperature. The nature of the diluent is subject to considerable variation, although the diluent employed should be liquid under the conditions of polymerization and relatively inert.

The polymerization diluent employed in practicing this invention should be purified, for best results, from traces of moisture, oxygen, carbon dioxide and polar organic compounds prior to use in the polymerization reaction by contacting the diluent for example, in a distillation procedure or otherwise, with an organoaluminum compound prior to or after percolating the diluent through silica gel or molecular sieves.

The polymerization time is not critical and will usually be of the order of thirty minutes to several hours in batch processes. Contact times of from one to several hours are commonly employed in autoclave type reactions. When a continuous process is employed, the contact time in the polymerization zone can also be regulated as desired, and generally it is not necessary to employ reaction or contact times much beyond one-half to several hours since a cyclic system can be employed by removal of the polymer and return of the diluent, if used, and unreacted monomer to the charging zone where the catalyst can be replenished and additional monomer introduced.

The treated polymerization catalyst component of this invention is normally used with an additive to control molecular weight such as hydrogen. Solid polymers having molecular weights greater than about 50,000 and less than about 2,000,000 result thereby. The amount of hydrogen to be used depends upon the molecular weight distribution to be obtained and is well known to those skilled in the art.

The polyolefins prepared in accordance with this invention can be extruded, mechanically melted, cast or molded as desired. They can be used to form plates, sheets, films or a variety of molded objects.

Usefully, the pressure range for the polymerization process using the solid catalyst component of this invention is about atmospheric to over 1000 p.s.i.g. More preferably, the pressure range varies from about 100 p.s.i.g. to about 800 p.s.i.g. and, most preferably, the pressure range used in the instant process is about 200 p.s.i.g. to about 700 p.s.i.g.

While the invention is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

GENERAL EXPERIMENTAL PROCEDURE

The magnesium ethoxide used was a commercial product from Alfa Products. The aluminum alkyl compounds were approximately 25 weight percent in heptane and were purchased from Texas Alkyls. The titanium tetrabutoxide was purchased from Stauffer Chemical Company. Particle size determinations were made by sieving which was done by placing ten grams of dried polymer product on a screen of the appropriate mesh size and gently shaking the screen for five minutes. Melt indices were determined according to ASTM D-1238.

EXAMPLE I

A mixture of 13.9 grams of $Mg(OC_2H_5)_2$ and 16.5 milliliters of $Ti(OC_4H_9)_4$ was heated for 19 hours at 130°-150° C. The mixture was cooled to 100° C and 35 milliliters of octane was added. The mixture was then allowed to cool to 35° C and 385 milliliters of an ethylaluminum dichloride solution (25 weight percent in hexane) was added over a two hour period. The result was treated by passing 3.5 grams of hydrogen chloride gas through a stirred suspension of the catalyst at 21°-29° C over a period of 110 minutes. Samples of the mixture were withdrawn several times and the final molar ratio, HCl/Al, of the slurry was 3.6. A 0.67 milligram sample of the solid catalyst component was tested by activating it with 22 milligrams of triethylaluminum and placing the combination in a stirred autoclave reactor containing 225 milliliters of hexane and 22 milligrams of triethylaluminum at 180° C. The reactor contained a partial pressure of 80 p.s.i.g. of hydrogen and a total pressure of 300 p.s.i.g. which was maintained throughout the one hour reaction by addition of ethylene. A polymer yield of 53.5 grams was obtained which contained 52.5 percent fines (material passing through a 70-mesh screen) compared to 75 percent fines for polyethylene made from an untreated catalyst.

EXAMPLE II

A mixture of 114 grams of $Mg(OC_2H_5)_2$, 136 grams of $Ti(OC_4H_9)_4$ and 100 milliliters of octane was heated at 129° C for 20 hours, after which one liter of hexane was slowly added and the mixture allowed to cool to room temperature After the solid material was removed by filtration, 3.1 liters of $Al(C_2H_5)Cl_2$ solution (25 weight percent in hexane) was added over a three-hour period and, after the mixture stood overnight, 10 milliliters of a dilute triethylaluminum solution (24 weight percent in hexane) was added. An 80 milliliter portion of this mixture was diluted with 250 milliliters of hexane and hydrogen chloride was bubbled through it at a measured rate. The Table below indicates the amount of hydrogen chloride absorbed by the slurry at the time each of four 25 milliliter portions were removed for polymerization.

TABLE

| Solid Catalyst Component No. | Temperature (° C) | HCl Added (grams) | Molar Ratio $HCl/Al(C_2H_5)Cl_2$ |
|---|---|---|---|
| 1 | 19 | 0 | 0 |
| 2 | 27.4 | 3.00 | 1.27 |
| 3 | 28.6 | 3.78 | 1.70 |
| 4 | 25.0 | 4.58 | 2.27 |

EXAMPLE III

Each of catalyst components from Example II, numbers 1, 2, 3 and 4 and 22 milligrams of $Al(C_2H_5)_3$, dissolved in 1-4 milliliters hexane, was used for the polymerization of ethylene employing a stirred autoclave reactor, 80 p.s.i.g. of hydrogen and a total pressure of 300 p.s.i.g. Polymerization time was one hour and polymerization temperature 80° to 84° C in each run. The Table below sets out the polymerization results.

TABLE

| Solid Catalyst Component | | Polymer Yield (grams) | Weight Percent Through a 70 Mesh Screen (Percent) |
|---|---|---|---|
| Number | Amount (milligrams) | | |
| 1 | 0.91 | 50.1 | 73.2 |
| 2 | 0.91 | 48.3 | 63.0 |
| 3 | 1.86 | 42.8 | 5.0 |
| 4 | 1.84 | 32.1 | 4.0 |

EXAMPLE IV

A mixture of 116.4 grams of magnesium ethoxide and 277 grams of tetrabutyltitanate was heated at 140° C until the solid had dissolved and then the flask was cooled to 110° C and one liter of hexane was added, cooling and diluting the solution to a final volume of 870 milliliters. A 105 milliliter portion of the above mixture, 100 milliliters of hexane, 46.1 grams of zirconium tetrachloride and 360 milliliters of an ethylaluminum dichloride solution (50 weight percent in hexane) were heated at the reflux temperature of the solvent for one hour and 200 milliliters of hexane added when the mixture has cooled. A 200 milliliter sample of the resulting mixture was removed for testing and designated solid catalyst component 1.

A 505 milliliter portion of the supernatant liquid was removed from the remainder and replaced with an equal volume of hexane. Thereafter, the result was treated by passing 28.3 grams of gaseous hydrogen chloride through the slurry which retained 15.6 grams and thus was designated solid catalyst component 2. The HCl/Al ratio was 1.06.

Polymerization activity was tested by putting a mixture of the solid catalyst component and triisobutylaluminum in a stirred autoclave reactor containing 86 milligrams of triisobutylaluminum, 235 milliliters hexane, 200 p.s.i.g. hydrogen and enough ethylene to maintain the total pressure at 300 p.s.i.g. After 1 hour at about 180° F the polymerization was terminated.

| Solid Catalyst Component | | (i-Bu)₃Al Promoter (milligrams) | Polymer Yield (grams) | M.I. (grams/ 10 min.) | Weight Percent Through a 70 Mesh Screen (percent) |
|---|---|---|---|---|---|
| Number | Amount (milligrams) | | | | |
| 1 | 8.2 | 172 | 24.4 | 0.14 | 35 |
| 2 | 3.3 | 86 | 10.9 | 0.09 | 22 |

EXAMPLE V

A mixture of 11.4 grams of magnesium ethoxide and 2.2 milliliters of titanium (IV) chloride in 100 milliliters of nonane was heated at 140° C for 45 minutes, cooled to ambient temperature, and 144 milliliters of ethylaluminum dichloride solution (50 weight percent in hexane) was slowly added to make solid catalyst component 1. After a sample of catalyst 1 was removed for testing, the supernatant liquid was decanted and replaced with hexane. Hydrogen chloride (4.04 grams) was passed through the stirred mixture which retained 2.37 grams to make solid catalyst component 2. The HCl/Al molar ratio is about 1.45. The polymerization runs were made in the same way as set out in Example I.

| Solid Catalyst Component | | Polymer Yield (grams) | M.I. (grams/10 min.) | Weight Percent Through a 70 Mesh Screen (percent) |
|---|---|---|---|---|
| Number | Amount (milligrams) | | | |
| 1 | 2.5 | 44.2 | 0.68 | 11 |
| 2 | 1.91 | 25.2 | 0.21 | 4 |

EXAMPLE VI

A mixture of 11.4 grams of magnesium ethoxide, 2.7 milliliters of tetrabutyltitanate, 2.2 milliliters of titanium (IV) chloride, and 100 milliliters of nonane was heated at 140° C for 1 hour, cooled to ambient temperature, and 144 milliliters of ethylaluminum dichloride solution (50 weight percent in hexane) added to make solid catalyst component 1. After a sample of solid catalyst composition 1 was removed for testing, the supernatant liquid was decanted and replaced with hexane. A 9.43 gram quantity of hydrogen chloride was passed with stirring through the remaining mixture which retained 5.85 grams to make solid catalyst component 2. The HCl/Al molar ratio is 1.44. The polymerization results with the catalyst components are shown below in the Table.

| Solid Catalyst Component | | Polymer Yield (grams) | M.I. (grams/ 10 min.) | Weight Percent Through a 70 Mesh Screen (percent) |
|---|---|---|---|---|
| Number | Amount (milligrams) | | | |
| 1 | 0.90 | 15.1 | 0.46 | 17 |
| 2 | 2.66 | 19.2 | 0.96 | 11 |

What is claimed is:
1. A catalyst for polymerizing ethylene or ethylene containing a small amount of polymerizable $C_3$ to $C_8$ olefin comprising:
  a. a solid catalyst component made between above about ambient to about 150° C. from (1) a lower alkyl, magnesium dialkoxide, (2) a transition metal compound which is at least one lower alkyl, titanium (IV) or vanadium (V) alkoxide, alkoxychloride or chloride, (3) a lower alkyl, alkylaluminum compound which is a trialkylaluminum, a dialkylaluminum chloride or an alkylaluminum dichloride, and (4) hydrogen chloride, using a mol ratio, said alkylaluminum compound to said transition metal compound, between about two-tenths and ten and a mol ratio, hydrogen chloride to said alkylaluminum compound, of greater than one, said component containing as a percentage of the support weight between one-tenth and 15 weight percent of the transition metal calculated as the metal; and
  b. a promoter which is a trialkylaluminum, a dialkylaluminum hydride, or a dialkylaluminum chloride wherein said component is made either (i) by reacting said magnesium dialkoxide with said transition metal compound, reacting the product thereof with said alkylaluminum compound and thereafter treating with said hydrogen chloride, or (ii) by together reacting said magnesium dialkoxide, said transition metal compound and said alkylaluminum compound and thereafter treating the product thereof with said hydrogen chloride.

2. The catalyst of claim 1 wherein (a) is effected in the presence of an inert liquid diluent.

3. The catalyst of claim 1 wherein said promoter is a lower alkyl, trialkylaluminum.

4. The catalyst of claim 2 wherein said promoter is a lower alkyl, trialkylaluminum.

5. The catalyst of claim 3 wherein said alkylaluminum compound is an alkylaluminum dichloride.

6. The catalyst of claim 4 wherein said alkylaluminum compound is an alkylaluminum dichloride.

7. The catalyst of claim 5 wherein said transition metal compound is at least a lower alkyl, titanium (IV) alkoxide.

8. The catalyst of claim 6 wherein said transition metal compound is at least a lower alkyl, titanium (IV) alkoxide.

9. The catalyst of claim 7 wherein said magnesium dialkoxide is magnesium diethoxide.

10. The catalyst of claim 8 wherein said magnesium dialkoxide is magnesium diethoxide.

* * * * *

UNITED STATES PATENT OFFICE
CERTIFICATE OF CORRECTION

Patent No. 4,039,472          Dated August 2, 1977

Inventor(s) Glen R. Hoff

It is certified that error appears in the above-identified patent and that said Letters Patent are hereby corrected as shown below:

Column 2, line 65    "affordingagent" should be -- affording agent

" 4, " 42    "prior to use the remove" should be -- prior to use to remove

" 6, " 64    "mixture has cooled" should be -- mixture had cooled

Signed and Sealed this

Twenty-second Day of November 1977

[SEAL]

Attest:

RUTH C. MASON         LUTRELLE F. PARKER
*Attesting Officer*     *Acting Commissioner of Patents and Trademarks*